W. MORRISON.
ELECTRIC BATTERY.
APPLICATION FILED AUG. 11, 1902. RENEWED JULY 26, 1909.
950,861.
Patented Mar. 1, 1910.
2 SHEETS—SHEET 1.
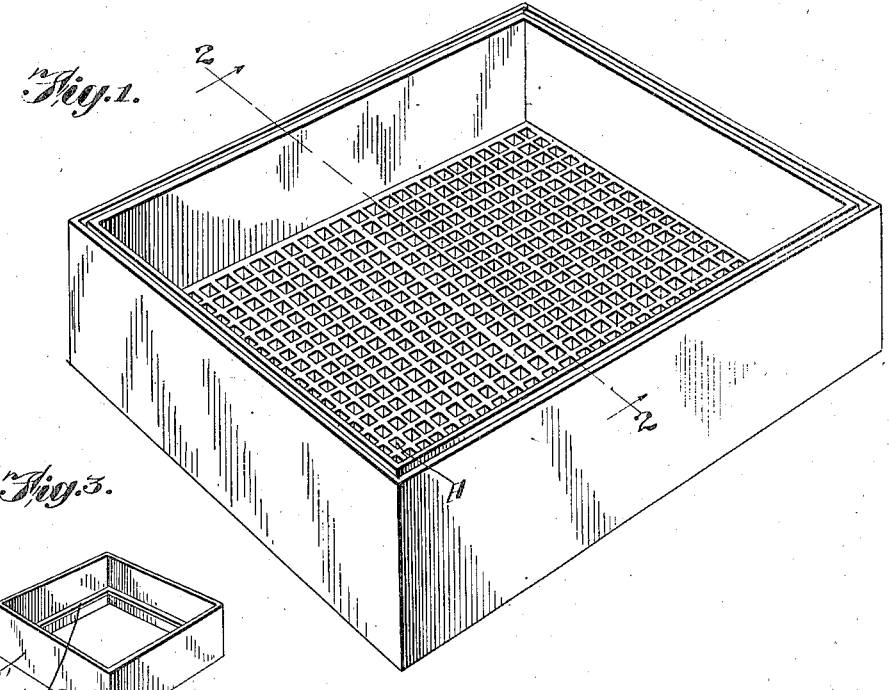
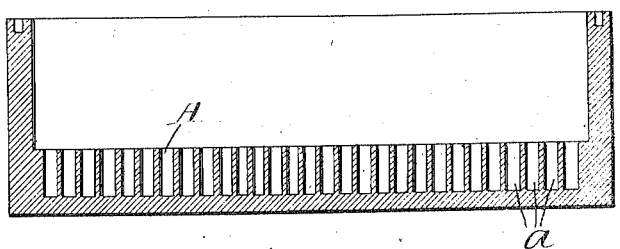
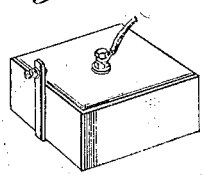
Witnesses:
J. B. Weir
Harry P. Baumgartner
Inventor:
William Morrison
By Chas. C. Buckley
Atty

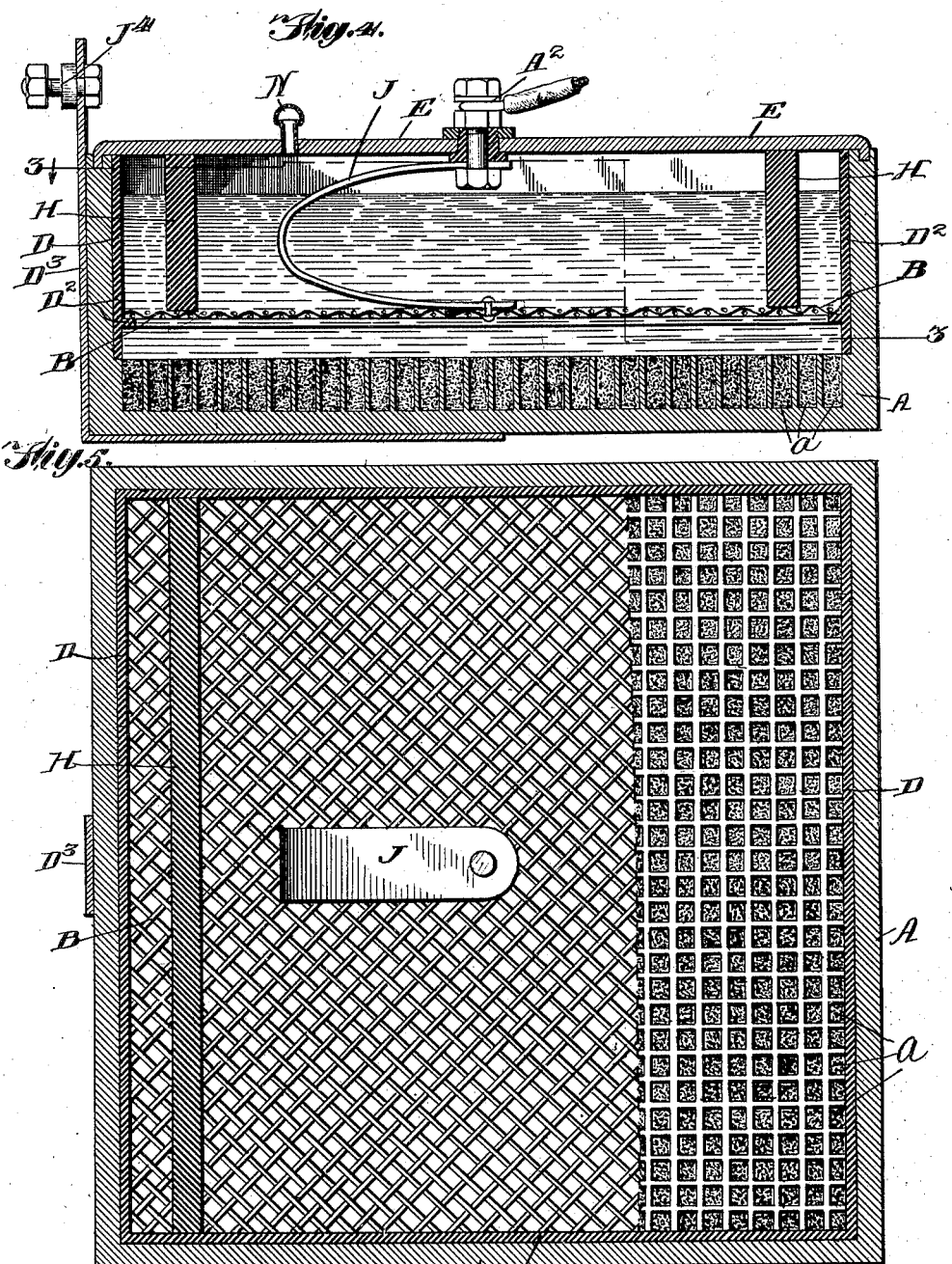

UNITED STATES PATENT OFFICE.

WILLIAM MORRISON, OF CHICAGO, ILLINOIS.

ELECTRIC BATTERY.

950,861. Specification of Letters Patent. Patented Mar. 1, 1910.

Application filed August 11, 1902, Serial No. 119,205. Renewed July 26, 1909. Serial No. 509,700.

*To all whom it may concern:*

Be it known that I, WILLIAM MORRISON, a citizen of the United States of America, and resident of Chicago, Cook county, Illinois, have invented a certain new and useful Improvement in Electric Batteries, of which the following is a specification.

It is the object of my invention to produce a more highly efficient battery, of longer life and of greater capacity. To accomplish these and other incidental results I employ a solution of bromid of zinc, or other suitable bromid.

In my invention I provide a containing cell of a material capable of withstanding the attacks of the bromin when liberated. The solution of bromid of zinc is placed in the cell and in the charge the bromid of zinc is separated into zinc and bromin, the bromin being released and electrodeposited upon the bottom of the cell, the greater part thereof remaining in contact with the bottom of the cell because its specific gravity is higher than that of the electrolyte, and as it is insoluble in the electrolyte to a considerable extent, while the zinc is electrodeposited upon a suitable support.

In describing one way of carrying out my invention I shall incidentally describe and illustrate a containing cell of carbon the bottom of which constitutes the negative element and also means for holding the liquid bromin more stable, but it will be understood that I have claimed these features in other applications filed concurrently herewith, No. 119,201, my present application being confined to the feature of the gravity bromin cell.

I will now particularly describe my invention having reference to the accompanying drawings, in which:

Figure 1, is a perspective view of a cell showing the negative element in the bottom of the cell. Fig. 2, is a central cross section through the cell on the line 2—2. Fig. 3, is a perspective view showing the insulator and support for the positive element. Fig. 4, is a central cross section view of the completed cell. Fig. 5, is a section view on the line 3—3 of Fig. 4. Fig. 6, is a perspective view of the exterior of a completed cell.

The cell A as I have shown and prefer to use it, is of carbon, although in this application I do not make any claim for the material of which the cell is composed. In the bottom of the cell is formed a number of pockets, or recesses $a$—$a$, which as the whole cell is of carbon provides a negative element having a plurality or multiplicity of pockets or recesses. Above this negative element, which may, as a whole, be designated at A, is held, at a suitable distance therefrom, the positive element B, which consists of copper wire gauze or other suitable material. An electrolyte of bromid of zinc, or other suitable bromid, is placed in the cell.

In the charge the bromid of zinc is separated or split up into zinc and bromin, the zinc being electrodeposited upon the upper positive element B, and the bromin deposited upon the negative element A in the bottom of the cell, and as the bottom of the cell is the negative element, the bromin is electrodeposited upon the negative element and tends to remain thereon, its high specific gravity being higher than that of the electrolyte and because it is to a considerable extent insoluble in the electrolyte. As shown and described herein the cell is of carbon and consequently the bottom of the cell is carbon and therefore a negative element is provided upon which the bromin is deposited. But, however, it is evident that some kind of material other than carbon can be employed for the cell, such as glass for instance, and the negative element disposed upon the bottom of the cell, and this constitutes another way of carrying out my invention which I have described and claimed in another application filed concurrently herewith, No. 119,204.

Although I have thus particularly described and illustrated the negative element located in the bottom of the cell or as the bottom of the cell as one way of carrying out my invention it will be understood, however, that my invention consists in a gravity bromin battery and comprehends and includes within it any method of employing gravity to hold the liquid bromin in contact with the negative element.

It is evident that this battery may be used as a primary by placing bromin upon or over the bottom of the cell, and providing a suitable electrolyte, and a positive element of zinc or other suitable metal.

In order to prevent the electrodeposition of the bromin upon the sides of the carbon cell, which would fall off upon or around the edges of the negative element causing an uneven distribution of the bromin upon the negative element, I provide an insulating band D, having a rib $D^2$, which covers up and isolates the sides of the carbon cell, the rib $D^2$, serving as a support for the positive element. This insulator also prevents the formation of an excessive amount of the zinc about the edges of the positive element.

Between the positive element B and the cover E are the spacing strips H which are held in a bearing position between the positive element and the cover, when the latter is fastened in position upon the contained cell. A conductor strip J is connected with the positive element at one end and at the other end to a binding post $A^2$ which constitutes one terminal of the cell, a conductor strip $D^3$ being attached to the bottom of the cell and to its sides and terminating at the binding post $J^4$, which constitutes the other terminal of the battery.

It is also evident that the electrolyte may be of any suitable bromid or bromids.

As bromin is volatile in air and also casts off an offensive odor it is desirable that in each case the cover should be sealed to the body of the containing cell and as shown it will be observed that the edge of the cover fits within a groove formed in the upper edge of the containing cell and thus the edge of the cover may be conveniently sealed to the containing cell by any suitable sealing material.

In order to provide means for the escape of any gases or gas within the battery cell I provide a safety vent N of any ordinary and suitable construction which will release the gas automatically when any gas is within the containing cell.

I have shown and described herein all of those parts which are essential to the construction of a practical battery but it will be understood that my invention so far as this application is concerned, as stated, is confined to the gravity bromin cell.

The serial numbers of my co-pending applications are 119,201, 119,202, 119,203 and 119,204.

I claim—

A battery, a negative element therefor provided with a supporting surface, depositable bromin in the battery electrolyte, said surface being contoured to independently retain said bromin thereon when deposited.

Signed by me at Chicago, Cook county, Illinois, this eighth day of August, 1902.

WILLIAM MORRISON.

Witnesses:
CHAS. C. BULKLEY,
HARRY P. BAUMGARTNER.